(12) United States Patent
Linglin et al.

(10) Patent No.: US 9,737,936 B2
(45) Date of Patent: Aug. 22, 2017

(54) PROCESS FOR DRILLING A TUNNEL IN WHICH TO PLACE A SENSOR IN A COOKING VESSEL AND VESSEL CREATED BY SAID PROCESS

(71) Applicant: SEB S.A., Ecully (FR)

(72) Inventors: Benoît Linglin, Saint Martin Bellevue (FR); Sylvain Perreal, Rumilly (FR); Stephane Charvin, Saint Felix (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 14/929,755

(22) Filed: Nov. 2, 2015

(65) Prior Publication Data

US 2016/0121408 A1    May 5, 2016

(30) Foreign Application Priority Data

Nov. 3, 2014    (FR) ..................... 14 60585

(51) Int. Cl.
| | |
|---|---|
| *B23B 35/00* | (2006.01) |
| *A47J 27/00* | (2006.01) |
| *A47J 27/08* | (2006.01) |
| *A47J 37/10* | (2006.01) |

(52) U.S. Cl.
CPC ............ *B23B 35/00* (2013.01); *A47J 27/002* (2013.01); *A47J 27/08* (2013.01); *A47J 37/10* (2013.01); *A47J 2202/00* (2013.01); *B23B 2222/04* (2013.01); *Y10T 408/03* (2015.01); *Y10T 408/23* (2015.01); *Y10T 409/303752* (2015.01)

(58) Field of Classification Search
CPC ..... B23B 35/00; A47J 27/002; A47J 2202/00; Y10T 408/03; Y10T 408/23
See application file for complete search history.

(56) References Cited

U.S. PATENT DOCUMENTS

| | | | |
|---|---|---|---|
| 2,453,136 A | 11/1948 | Karweit | |
| 3,000,225 A * | 9/1961 | Taylor | ............... B25D 16/00 173/115 |
| 4,624,607 A * | 11/1986 | Kato | ............... B23Q 5/06 408/1 R |
| 5,441,344 A * | 8/1995 | Cook, III | ............... A47J 43/28 374/141 |
| 5,620,255 A | 4/1997 | Cook, III | |
| 6,637,986 B2 * | 10/2003 | Powell | ............... G05B 19/182 408/1 R |
| 6,772,846 B1 * | 8/2004 | Scharp | ............... B23B 35/00 123/193.6 |

(Continued)

FOREIGN PATENT DOCUMENTS

| | | |
|---|---|---|
| DE | 102008015973 A1 | 10/2009 |
| EP | 1591049 A1 | 11/2005 |
| EP | 2301393 A1 | 3/2011 |

*Primary Examiner* — Eric A Gates
(74) *Attorney, Agent, or Firm* — The Webb Law Firm

(57) ABSTRACT

Provided is a process for drilling a tunnel (11) in which to place a sensor, in particular a temperature sensor, in a cooking vessel (1) comprising a bowl (2) with a bottom (3) having a thickness (e), said process comprising a step for drilling said tunnel made in the thickness (e). The drilling step comprises a pre-drilling step using a drill bit with a diameter of D1, and a deep drilling step using a drill bit with a diameter of D2, D1 being greater than D2.

19 Claims, 2 Drawing Sheets

(56) References Cited

U.S. PATENT DOCUMENTS

| | | | | |
|---|---|---|---|---|
| 7,157,675 B2* | 1/2007 | Imura | ............... | A47J 27/62 |
| | | | | 219/627 |
| 7,909,549 B2* | 3/2011 | Kondoh | ............ | B23B 35/00 |
| | | | | 408/1 R |
| 8,783,947 B2* | 7/2014 | Ferron | ............ | A47J 45/068 |
| | | | | 220/756 |
| 9,242,286 B2* | 1/2016 | Maravic | ............ | A47J 27/002 |
| 2001/0032388 A1* | 10/2001 | Morris | ............ | H05K 1/112 |
| | | | | 29/852 |
| 2007/0095215 A1* | 5/2007 | Ho | ..................... | A47J 37/10 |
| | | | | 99/342 |
| 2011/0268153 A1* | 11/2011 | He | ................ | A47J 37/108 |
| | | | | 374/179 |
| 2013/0259588 A1* | 10/2013 | Kasubata | .......... | B23B 35/00 |
| | | | | 408/1 R |

* cited by examiner

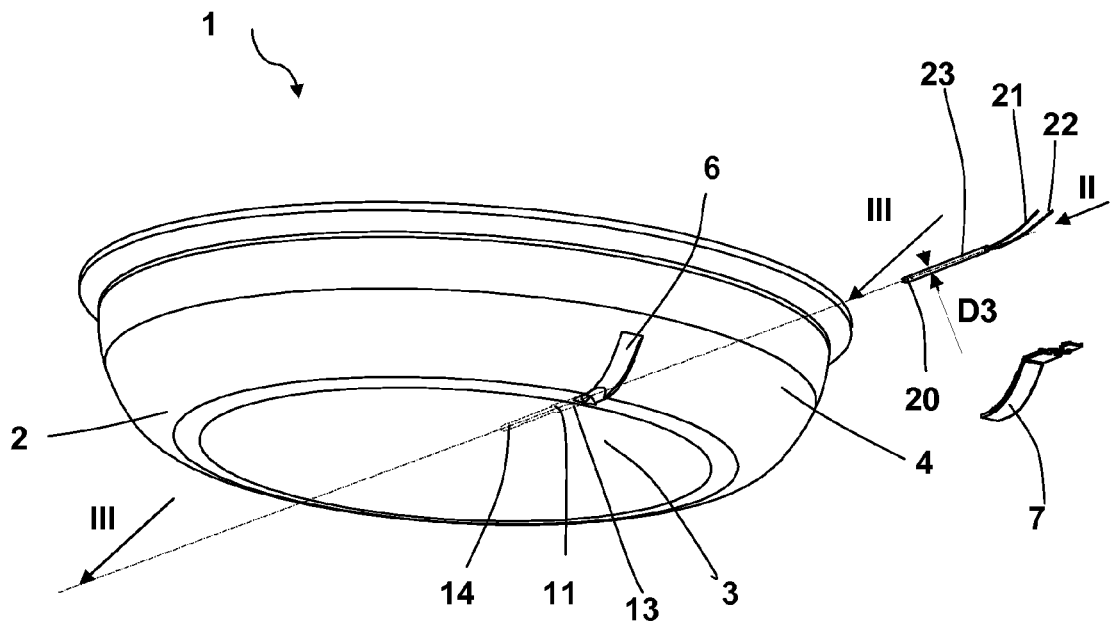
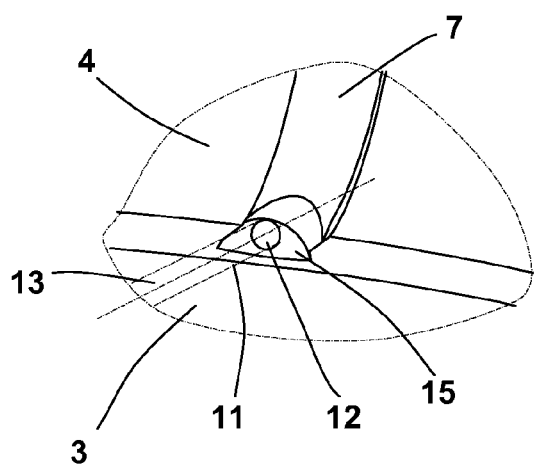 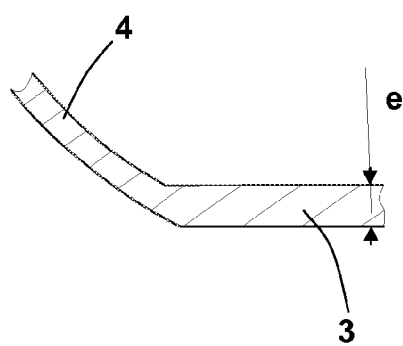
Fig.1
Fig.2　　　　Fig.3

PROCESS FOR DRILLING A TUNNEL IN WHICH TO PLACE A SENSOR IN A COOKING VESSEL AND VESSEL CREATED BY SAID PROCESS

CROSS-REFERENCE TO RELATED APPLICATION

This application claims priority to French Patent Application No. 1460585 filed Nov. 3, 2014, the disclosure of which is hereby incorporated in its entirety by reference.

FIELD OF THE INVENTION

This invention pertains to a process for drilling a tunnel in which to place a sensor in a cooking vessel, and more specifically a tunnel in which to place a temperature sensor, and a cooking vessel created by such a process. The cooking vessel is intended to be positioned on a hot plate, burner or the like, for cooking food, such as a frying pan, saucepan, sauté pan, stockpot or pressure cooker for example.

DESCRIPTION OF RELATED ART

There exists, in patent EP1591049, a cooking vessel with a bottom and a temperature sensor positioned inside a placement tunnel made in the bottom. The process for making the sensor placement tunnel, as described in said document, comprises a drilling step.

However, standard cooking vessels have bottoms with thicknesses that vary, for example, from 4 millimeters to 6 millimeters. Thus, a placement tunnel made by drilling will require the use of a drill bit with a small diameter so that a thickness of the bottom material will remain on either side of the drilled hole. This thickness of bottom material may not exceed a few tenths of a millimeter. Moreover, in order to monitor a temperature in a pertinent and effective way, it is necessary to arrange the sensor in the bottom of the cooking vessel in a manner that is offset enough from the edge of the bowl, for example, by positioning a sensitive part of the sensor at a distance of at least 50 millimeters from the edge.

Thus, such a process for making a tunnel in which to place a sensor by drilling uses a drill bit that is small in diameter and very long, and that will be very fragile and will wear out prematurely.

In addition, the thickness of the bottom, which is very close to the diameter of the drill bit, does not allow for any deviation of the drill bit while drilling, which makes it necessary to work at very slow production rates.

Finally, the placement tunnel is drilled in a bottom that is made of aluminum, in particular. Drilling with a very long, small-diameter drill bit results in a high concentration of heat at the tip of the drill bit, as well as great difficulty removing the shavings from the hole, which "stick" to the drill bit, resulting in long core removal times and frequent hole deformations.

The purpose of this invention is to remedy the aforementioned disadvantages and to offer a process for drilling a tunnel in which to place a sensor in a cooking vessel, which is inexpensive to implement.

Another purpose of this invention is to offer a process for drilling a tunnel in which to place a sensor in a cooking vessel, which makes it possible to obtain a tunnel with dimensions that are controlled and consistent from one vessel to another.

SUMMARY OF THE INVENTION

These purposes are achieved with a process for drilling a tunnel in which to place a sensor, such as a temperature sensor, in a cooking vessel comprising a bowl having a bottom with a thickness (e), into which said placement tunnel is drilled, characterized in that said process comprises a pre-drilling step using a drill bit of Diameter D1, for making the first portion of the placement tunnel, and a deep drilling step using a drill bit of Diameter D2, for making a second portion of the placement tunnel, D1 being greater than D2.

A first portion corresponding to a first hole is thus made in the pre-drilling step. This first hole will serve as a centering tube and will stabilize the end of the longer drill bit used in the deep drilling step for making the second portion, the radial clearance of the longer drill bit end being limited by the wall of the first hole. Indeed, a drill bit, by construction, is never perfectly rectilinear. It always has a runout. Thus, properly guiding the longer drill bit end makes it possible to create a second portion in the form of a second hole along the axis of the first, and thereby obtain a rectilinear tunnel, without deviation, with controlled dimensions that are consistent from one cooking vessel to another.

Advantageously, the pre-drilling and deep drilling steps are performed successively, in order to optimize the production rate.

Advantageously, the ratio between Diameter D1 and Diameter D2 is between 1.005 and 1.05, and preferably between 1.01 and 1.02.

Thus, the long drill bit used in the deep drilling step has a diameter (D2) that is very slightly smaller than the short drill bit used in the pre-drilling step. This arrangement makes it possible to achieve excellent centering of the end of the long drill bit, while minimizing the friction of the long drill bit of Diameter D2 inside the hole made by the short drill bit of Diameter D1.

Preferably, Diameter D2 is between 2 and 3 millimeters, and preferably 2.5 millimeters.

The minimum thickness of the bottom of a standard cooking vessel is approximately 4 mm. Such a diameter therefore makes it possible to create a placement tunnel that is compatible with all cooking vessel product lines.

Advantageously, the first portion of the placement tunnel has a depth of P1 and the second portion has a depth of P2, the ration between P2 and P1 being between 2 and 5, and preferably between 3 and 4.5.

This arrangement makes it possible to spend significantly less time on the pre-drilling step than the time spent on the deep drilling step, thereby optimizing the production rate.

Preferably, the depth (P2+P1) of the placement tunnel is between 50 and 70 millimeters, and preferably 60 millimeters.

Thus, a sensor arranged in the bottom of a placement tunnel with said depth will be offset enough from the edge of the bowl of the cooking vessel to detect a parameter, such as temperature, that is representative of the state of the food contained in the vessel, regardless of the size of the bottom of the cooking vessel.

In one advantageous method of implementation, in at least one drilling step, a drill head spins a drill bit and produces the axial forward movement of said drill bit, onto which an axial oscillation is superimposed at a given frequency. Preferably, the frequency of the axial oscillation applied to the drill bit is a low frequency of a few hertz. Such drilling is described, for example, in U.S. Pat. No. 2,453,136.

Such drilling allows for regular fractionation of the shavings. Consequently, the shaving clogging phenomena is eliminated and the risk of tool breakage is decreased, thereby making the process more reliable. In addition, the lifespan of the drill bit is extended. Indeed, the drill bit is operating only part of the time, due to cutting, which is paused at an optimum frequency, thereby allowing the tool to cool between each cutting phase.

Advantageously, in the pre-drilling and deep drilling steps, the drill bits spin at a rotation speed of V1, between 8,000 and 12,000 revolutions per minute, and preferably 10,000 revolutions per minute.

This range of drill bit rotation speed allows for the optimal removal of the shavings, particularly in aluminum.

Preferably, in the deep drilling step, the drill bit spins at an approach rotation speed of V2 when it is inserted into the tunnel made in the pre-drilling step, V2 being less than V1.

This arrangement avoids increasing the runout of the long drill bit. Thus, the end of the long drill bit can be inserted into the hole made in the pre-drilling step without a risk of touching the edge of this hole.

Advantageously, the ratio of Rotation Speed V1 over Rotation Speed V2 is between 10 and 100, and preferably 20.

Advantageously, the process for drilling a placement tunnel comprises a milling step prior to the drilling step.

This arrangement prepares a flat drilling surface that is perpendicular to a longitudinal axis of the drill bit. Thus, no lateral stress is exerted on the drill bit in the pre-drilling step. Consequently, the life span of the drill bit is improved.

Preferably, the material of the bottom into which the placement tunnel is drilled is made of aluminum.

The invention also pertains to a cooking vessel comprising a bowl with of a thickness (e) and a tunnel into which a sensor is placed, in particular a temperature sensor, said placement tunnel being arranged within the thickness (e), characterized in that the placement tunnel has a first portion of Diameter D1, followed by a second portion of Diameter D2, D1 being greater than D2, and in that it is made according to the process described above.

Thus, the sensor placement tunnel has a first and second portion, in succession. The first portion, which is larger in diameter, guides the sensor when it is inserted into the placement tunnel, and the second portion, of a smaller diameter, is adjusted to the size of the sensor for precise positioning, and even to slightly hold the sensor at the bottom of the placement tunnel. Consequently, the sensor cannot move around and will measure the temperature of the bottom in a manner that is repeatable and reliable over time.

Preferably, the cooking vessel is a frying pan, saucepan, sauté pan, stockpot or pressure cooker.

BRIEF DESCRIPTION OF THE DRAWINGS

The invention is better understood by reviewing the methods of implementation, which should by no means be taken as limiting [the scope of the invention], and which are depicted in the appended drawings, in which:

FIG. 1 presents a perspective view of a bowl of a cooking vessel comprising a sensor placement tunnel according to one particular method of implementing the invention.

FIG. 2 presents a partial view of the bowl and the placement tunnel along Direction II depicted in FIG. 1.

FIG. 3 presents a diagrammatic partial cross-section view of the uncut bowl, without the placement tunnel, along Line III-III depicted in FIG. 1.

DETAILED DESCRIPTION OF THE INVENTION

Figure 4:
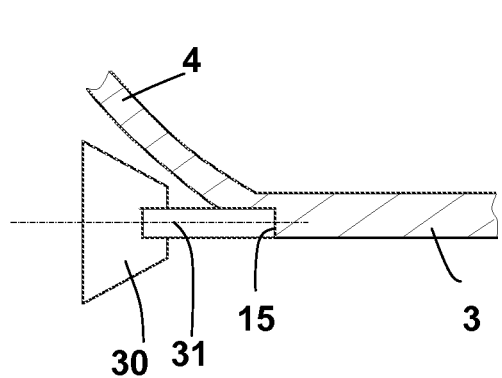
FIG. 4 presents a diagrammatic partial cross-section view of the bowl depicted in FIG. 3, in the milling step.

As can be seen in FIGS. 1 and 2, a bowl (2) of a cooking vessel (1) has of a bottom (3) and a side wall (4). The bowl (2) is made of aluminum, for example, by stamping a disc or by a casting operation. The bottom (3) has a thickness (e) equal to 4 millimeters, in which a tunnel (11) is arranged for the placement of a sensor (20). The placement tunnel (11) forms an opening (12) in the side wall (4) and extends from said opening (12), radially toward the center of the bottom (3). The placement tunnel (11) comprises, from the opening (12), a first portion (13) formed by a cylindrical hole of Diameter D1 (FIG. 9), and then a second portion (14) formed by a cylindrical hole of Diameter D2 (FIG. 9), Diameter D1 being greater than Diameter D2. The first and second portions (13, 14) have the same longitudinal axis.

The sensor (20), which can be seen in FIG. 1, is a temperature sensor, in particular, formed by an NTC or a thermocouple. The term NTC refers to a Negative Temperature Coefficient thermistor. The temperature sensor (20) is equipped with two insulated conductive elements (21, 22) that are arranged in a tubular sheath (23) made of stainless steel that is sealed at one end. The temperature sensor (20) is positioned at the bottom of the tubular sheath (23), near the sealed end. The conductive elements (21, 22) are connected electrically to an electronic circuit (not depicted in the drawings) to process the value measured by the temperature sensor (20) and display the temperature.

The tubular sheath (23) has a diameter (D3) that is roughly constant over the length of the tubular sheath. The diameter (D3) is slightly less than the diameter (D2) of the second portion (14) so that the tubular sheath (23), once completely inserted in the placement tunnel (11) is held in position adequately, almost without play. Because Diameter D2 is smaller than Diameter D1, the tubular sheath (23) has more play in the first portion (13). The first portion (13) thus serves as a guiding area for the tubular sheath (23) when it is inserted into the placement tunnel (11).

The side wall (4) comprises a groove (6) extending from the opening (12) of the placement tunnel (11) toward the top of the side wall (4). The groove (6) is intended for the placement of the conductive elements (21, 22) once the tubular sheath (23) is inserted into the placement tunnel (11). A protective cover (7) is arranged on the groove (6) to form a protective channel for the sensor (20) and the conductive elements (21, 22).

The cooking vessel has a handle (not depicted in the drawings), one end of which is attached to the side wall by a means of attachment (not depicted in the drawings). The conductive elements (21, 22) and the protective cover (7) are arranged on the handle.

FIGS. 3 through 9 illustrate the various steps of implementing the process for drilling the placement tunnel (11) for the sensor (20). A partial cross-section of the uncut bowl (2) is depicted in FIG. 3.

Figure 5:
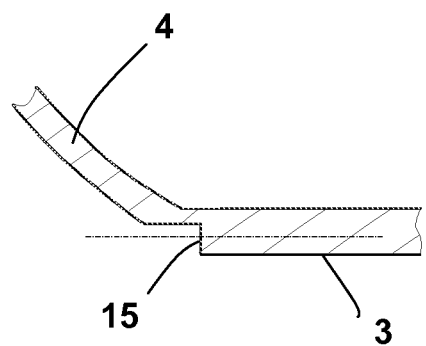
FIG. 5 presents a diagrammatic partial cross-section view of the bowl depicted in FIG. 3, after the milling step.

The first step of the process consists of making a flat surface (15) in the side wall (4) at the bottom (3) by means of milling. A machining head (30) spins a milling-cutter (31) with a flat end, and this machining head (30) is driven forward along a radial direction with respect to the bottom (3) (FIG. 4). Thus, the flat end of the milling-cutter (31) will make the flat surface (15), which is perpendicular to the bottom (3) (FIG. 5).

Figure 6:
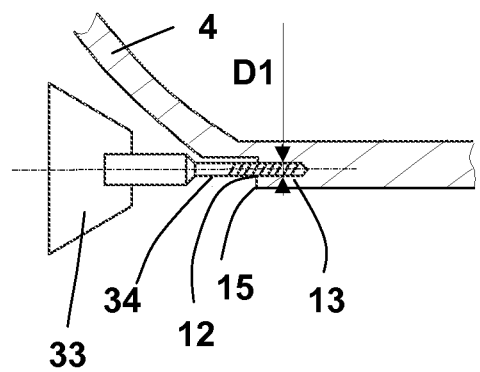
FIG. 6 presents a diagrammatic partial cross-section view of the bowl depicted in FIG. 3, in the pre-drilling step.
Figure 7:
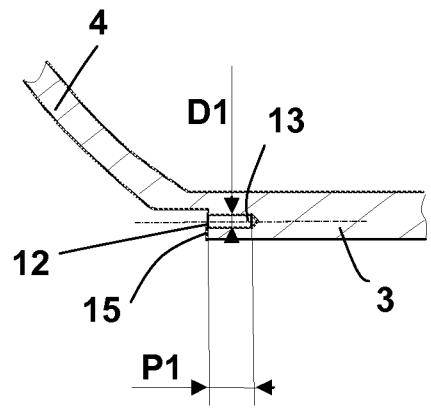
FIG. 7 presents a diagrammatic partial cross-section view of the bowl depicted in FIG. 3, after the pre-drilling step.

The next step of the process consists of a step to pre-drill the first portion (13) in the form of a hole with a diameter of D1, for example 2.55 millimeters, and with a depth (P1) equal to 13 millimeters within the thickness of the bottom (3). A drill head (33) spins a short drill bit (34) at a speed of V1, for example 10,000 revolutions per minute, and produces an axial forward movement of the drill bit (34). The drill head (33) is driven forward along the same radial direction with respect to the bottom (3) as the machining head (30) (FIG. 6). Thus the drill bit (34) will make the first portion (13) of the placement tunnel (11) with a depth of P1 (FIG. 7). In one variation of implementation, an axial oscillation at a given frequency can be superimposed on the forward movement of the drill bit (34).

Figure 8:
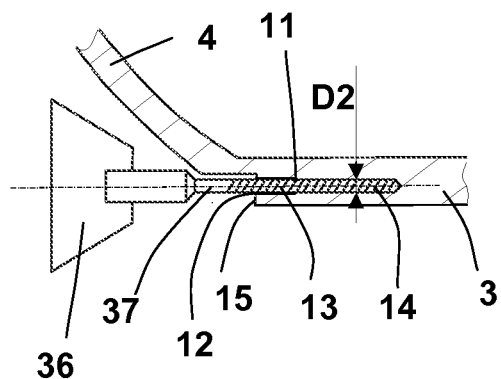
FIG. 8 presents a diagrammatic partial cross-section view of the bowl depicted in FIG. 3, in the deep drilling step.
Figure 9:
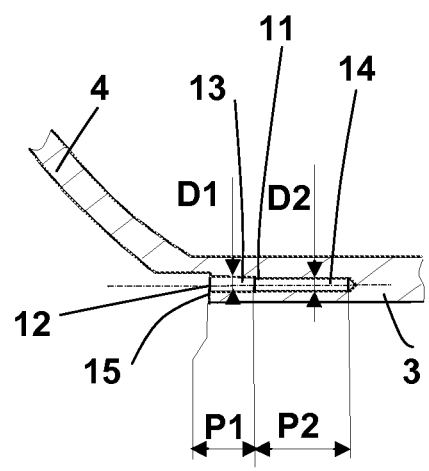
FIG. 9 presents a diagrammatic partial cross-section view of the bowl depicted in FIG. 3, after the deep drilling step.

The process then includes a deep drilling step for the second portion (14) in the form of a hole with a diameter of D2, for example 2.5 millimeters, and a depth (P2) equal to 47 millimeters within the thickness of the bottom (3). In the same way as for pre-drilling, a drill head (36) spins a long drill bit (37) at a speed of 10,000 revolutions per minute, for example, and produces the forward axial movement of the drill bit (37). The drill head (36) is driven in a forward movement along the same radial direction with respect to the bottom (3) as the machining head (30) and the drill head (33) (FIG. 8). Thus, the drill bit (37) will make the second portion (14) of the placement tunnel (11) (FIG. 9). The total depth (P1+P2) of the placement tunnel (11) is therefore equal to 60 millimeters. In one variation of implementation, an axial oscillation at a given frequency may be superimposed on the forward movement of the drill bit (37).

In one variation of implementation, during the deep drilling step, the long drill bit (37) is spun at a rotation speed (V2) of 500 revolutions per minute when it is inserted into the first portion (13) made in the pre-drilling step, and it is spun at a speed (V1) of 10,000 revolutions per minute just before the drill bit (37) begins drilling the second portion (14) of the placement tunnel (11).

Of course, the invention is in no way limited to the methods of implementation described and illustrated, which have been provided only as an example. Modifications remain possible, particularly from the standpoint of the makeup of the various components or by substituting technical equivalents, while nevertheless remaining within the scope of protection of the invention.

Thus, in one variation of implementation, the cooking vessel comprises a bowl made of aluminum, one external surface of the bottom of which is equipped with a perforated stainless steel plate. The placement tunnel is made within the thickness of the aluminum part of the bottom.

The invention claimed is:

1. Process for drilling a tunnel in which to place a sensor in a cooking vessel comprising a bowl with a bottom having a thickness in which a said placement tunnel is made, wherein the process comprises a pre-drilling step using a first drill bit with a diameter of D1 to make a first portion of the placement tunnel, and a deep drilling step using a second drill bit with a diameter of D2 to make a second portion of the placement tunnel, wherein D1 is greater than D2, wherein a ratio between D1 and D2 is between 1.005 and 1.05.

2. Process for drilling a placement tunnel in a cooking vessel as described in claim 1, wherein D2 is between 2 and 3 millimeters.

3. Process for drilling a placement tunnel in a cooking vessel according to claim 1, wherein the first portion of the placement tunnel has a depth of P1, and wherein the second portion has a depth of P2, wherein a ratio between P2 and P1 is between 2 and 5.

4. Process for drilling a placement tunnel in a cooking vessel as described in claim 3, wherein the depth (P1+P2) of the placement tunnel is between 50 and 70 millimeters.

5. Process for drilling a placement tunnel in a cooking vessel as described in claim 3, wherein the depth (P1+P2) of the placement tunnel is 60 millimeters.

6. Process for drilling a placement tunnel in a cooking vessel as described in claim 1, wherein in at least one drilling step, a drill head spins a drill bit and produces axial forward movement of said drill bit on which an axial oscillation is superimposed at a given frequency.

7. Process for drilling a placement tunnel in a cooking vessel as described in claim 6, wherein the frequency of the axial oscillation applied to the drill bit is a low frequency of a few hertz.

8. Process for drilling a placement tunnel in a cooking vessel as described in claim 1, wherein in the pre-drilling and deep drilling steps, the drill bits are spun at a rotation speed (V1) of between 8,000 and 12,000 revolutions per minute.

9. Process for drilling a placement tunnel in a cooking vessel as described in claim 8, wherein in the deep drilling step, the second drill bit is spun at an approach rotation speed of V2 when it is inserted into the first portion made in the pre-drilling step, wherein V2 is less than V1.

10. Process for drilling a placement tunnel in a cooking vessel as described in claim 9, wherein a ratio of V1 to V2 is between 10 and 100.

11. Process for drilling a placement tunnel in a cooking vessel as described in claim 9, wherein a ratio of V1 to V2 is 20.

12. Process for drilling a placement tunnel in a cooking vessel as described in claim 1, wherein the process further comprises a milling step prior to the drilling step.

13. Process for drilling a placement tunnel in a cooking vessel as described in claim 1, wherein the bottom into which the placement tunnel is drilled, is made of aluminum.

14. Cooking vessel comprising a bowl with a bottom having a thickness and a tunnel in which to place a sensor, said placement tunnel being arranged within the thickness, wherein the placement tunnel has a first portion with a diameter of D1, followed by a second portion with a diameter of D2, D1 being greater than D2, and wherein the tunnel is made by the process described in claim 1.

15. Cooking vessel as described in claim 14, selected from one of a frying pan, saucepan, sauté pan, stockpot or pressure cooker.

16. Process for drilling a placement tunnel in a cooking vessel as described in claim 1, wherein a ratio between D1 and D2 is between 1.01 and 1.02.

17. Process for drilling a placement tunnel in a cooking vessel as described in claim 1, wherein D2 is 2.5 millimeters.

18. Process for drilling a placement tunnel in a cooking vessel according to claim 1, wherein the first portion of the placement tunnel has a depth of P1, and wherein the second portion has a depth of P2, wherein a ratio between P2 and P1 is between 3 and 4.5.

19. Process for drilling a placement tunnel in a cooking vessel as described in claim 1, wherein in the pre-drilling and deep drilling steps, the drill bits are spun at a rotation speed (V1) of 10,000 revolutions per minute.

* * * * *